United States Patent
Bilder et al.

(10) Patent No.: US 7,724,884 B1
(45) Date of Patent: May 25, 2010

(54) METHOD AND APPARATUS FOR NOTIFYING CALLED AND/OR CALLING PARTIES OF A CALL PLACEMENT

(75) Inventors: Mitchell K. Bilder, Manalapan, NJ (US); Ardell Burgess, Glen Gardner, NJ (US); Raymond G. Gardner, Jr., Middle Village, NY (US); Andrew Jurczak, Pinckney, MI (US); Karen McGregor-Barnes, Manalapan, NJ (US); Cathleen Rucki Wild, Bedminster, NJ (US); Eberhard F. Wunderlich, Princeton, NJ (US)

(73) Assignee: AT&T Corp., New York, NY (US)

( * ) Notice: Subject to any disclaimer, the term of this patent is extended or adjusted under 35 U.S.C. 154(b) by 1219 days.

(21) Appl. No.: 11/233,427

(22) Filed: Sep. 22, 2005

Related U.S. Application Data

(60) Provisional application No. 60/611,983, filed on Sep. 22, 2004.

(51) Int. Cl.
*H04M 1/64* (2006.01)
*H04M 11/00* (2006.01)
*H04M 3/42* (2006.01)

(52) U.S. Cl. .............................. 379/201.02; 379/88.11; 379/93.24; 379/100.06; 379/102.07; 379/201.05; 379/201.08

(58) Field of Classification Search .............. 379/99.11, 379/88.13, 88.17, 88.19, 88.2, 88.21, 88.22, 379/207.05, 207.08, 88.11, 88.12, 93.01, 379/93.23, 93.24, 100.06, 102.07, 207.04, 379/207.09, 201.01, 201.02
See application file for complete search history.

(56) References Cited

U.S. PATENT DOCUMENTS

| | | | |
|---|---|---|---|
| 7,542,558 B2 * | 6/2009 | Klein et al. ............. | 379/201.01 |
| 2004/0005042 A1 * | 1/2004 | Dhara et al. ........... | 379/142.01 |
| 2004/0248560 A1 * | 12/2004 | Bedingfield et al. ....... | 455/412.2 |
| 2005/0074109 A1 * | 4/2005 | Hanson et al. ......... | 379/207.04 |
| 2005/0100145 A1 * | 5/2005 | Spencer et al. ........... | 379/88.22 |
| 2005/0123114 A1 * | 6/2005 | Trandal et al. ......... | 379/201.01 |
| 2007/0117546 A1 * | 5/2007 | Doulton ..................... | 455/413 |
| 2009/0019352 A1 * | 1/2009 | Afshar et al. ................ | 715/222 |

* cited by examiner

*Primary Examiner*—Binh K Tieu

(57) ABSTRACT

A method and apparatus for providing email notification for called and/or calling parties of a call placement are disclosed. The method enables a packet network service provider, e.g., a VoIP or SoIP service provider, to register customers for email notification service, to obtain the disposition of calls from Call Detail Records (CDRs), call control elements or application servers that have access to call signaling information in real time, to identify calls that resulted in ringing without an answer or busy disposition, and to determine whether or not the called and/or calling party subscribed to the email notification service. If the calling and/or called party subscribe to the notification service, the service provider sends an email notification to the calling and/or called party containing the caller and called party information, the time of the call, the disposition of the call and the like.

18 Claims, 4 Drawing Sheets

300

METHOD AND APPARATUS FOR NOTIFYING CALLED AND/OR CALLING PARTIES OF A CALL PLACEMENT

This application claims the benefit of U.S. Provisional Application No. 60/611,983 filed on Sep. 22, 2004, which is herein incorporated by reference.

The present invention relates generally to communication networks and, more particularly, to a method and apparatus for notifying called and/or calling parties when the call is unanswered or the called party is busy for calls made over communication networks, e.g., packet networks such as Voice over Internet Protocol (VoIP) and Service over Internet Protocol (SoIP) networks.

BACKGROUND OF THE INVENTION

The Internet has emerged as a critical communication infrastructure, carrying traffic for a wide range of important scientific, business and consumer applications. Businesses and consumers are finding the Internet based infrastructure less costly and they are moving towards combining all the data and voice services on this infrastructure. Thus, customers may use a single connection to access an email system, to hold a telephone conversation, and so on. However, if a customer without a caller Identification (ID) and call waiting service is using the phone, the customer may not realize that someone is trying to call him or her. Similarly, if the customer is away from the phone and the customer does not have a voicemail service, then the customer would not be able to determine that someone has called while he or she was away.

Therefore, there is a need for a method and apparatus to notify the called and/or calling parties when the call results in an unanswered or a busy disposition.

SUMMARY OF THE INVENTION

In one embodiment, the present invention discloses a method and apparatus for notifying called and/or calling parties when a call results in an unanswered or a busy disposition on communication networks, e.g., packet networks such as Voice over Internet Protocol (VoIP) and Service over Internet Protocol (SoIP) networks. In one embodiment, the method enables the VoIP or SoIP service provider to register customers for email notification service, to obtain the disposition of calls from Call Detail Records (CDR) or application servers that have access to call signaling information in real time, to identify calls that resulted in unanswered or busy disposition and to determine whether or not the called and/or calling party subscribed to the email notification service. If the calling and/or called party subscribed to the notification service, the service provider will send an email notification to the calling and/or called party containing the caller and called party information, the time and the disposition of the call. The notification enables the called party to realize that a calling party has attempted to call when the called party was busy or absent, whereas the notification enables the calling party to keep records of calls that were made, but the calls were never completed because the called parties were either busy or did not answer. If the customer is using a dial-up connection with the phone line, the customer could also use this service to be notified of calls while connected to the Internet.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for notifying called and/or calling parties for calls made over communication networks, e.g., packet networks such as Voice over Internet Protocol (VoIP) and Service over Internet Protocol (SoIP) networks. Although the present invention is discussed below in the context of notifying called/calling parties on VoIP and SoIP networks, the present invention is not so limited. Namely, the present invention can be applied for other telecommunications networks such as the traditional time division multiplexed network.

Figure 1:
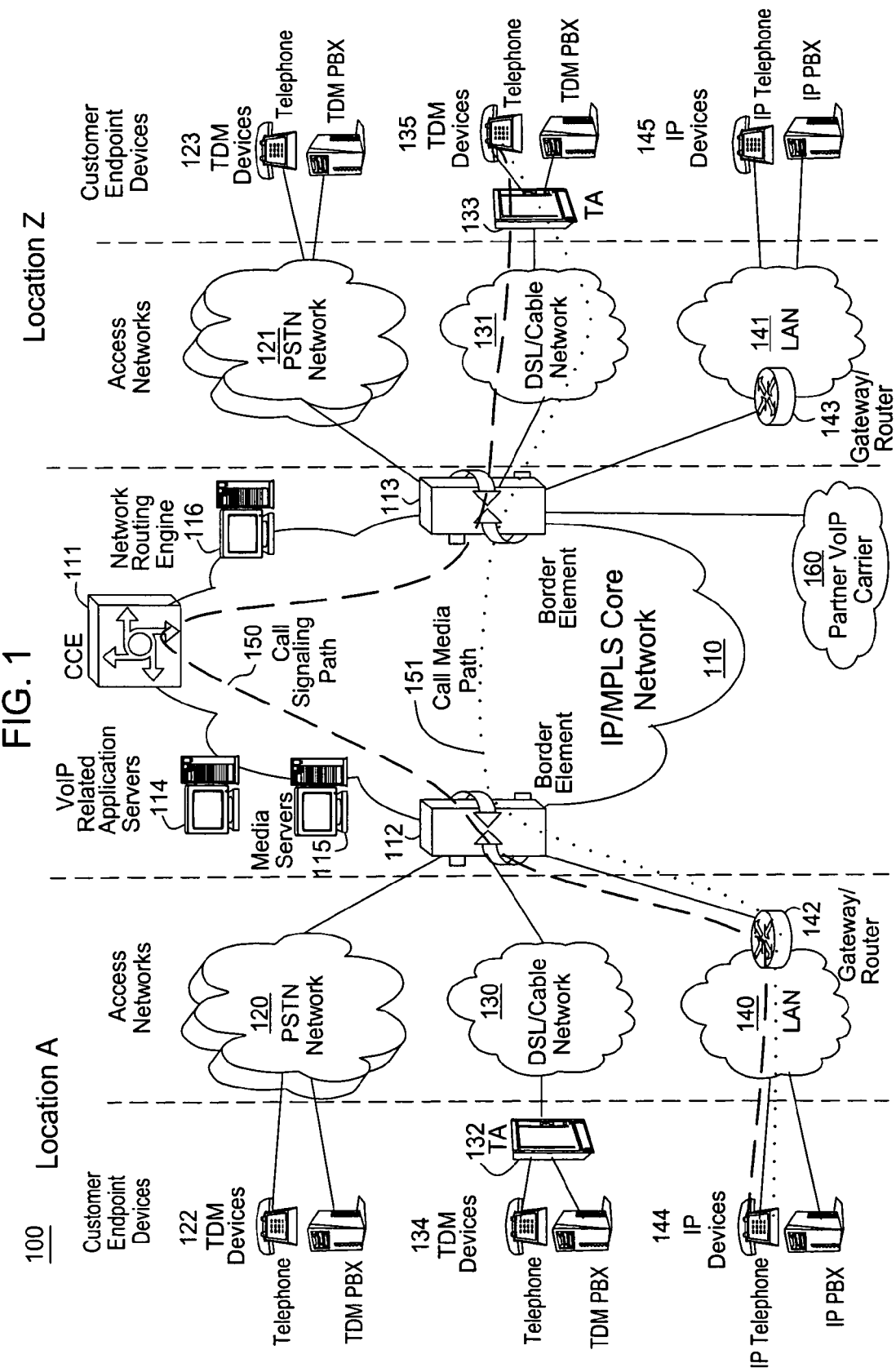
FIG. 1 illustrates an exemplary network related to the present invention.

To better understand the present invention, FIG. 1 illustrates a communication architecture 100 having an example network, e.g., a packet network such as a global IP/MPLS core network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the IP/MPLS core network may comprise various types of customer endpoint devices connected via various types of access networks to a carrier (a service provider) core infrastructure over an Internet Protocol/Multi-Protocol Label Switching (IP/MPLS) based core backbone network. Broadly defined, a VoIP or SoIP network is a network that is capable of carrying packetized data for voice or other data services over the IP network. The present invention is described below in the context of an illustrative VoIP network. Thus, the present invention should not be interpreted as limited by this particular illustrative architecture.

The customer endpoint devices can be either Time Division Multiplexing (TDM) based or IP based. TDM based customer endpoint devices 122, 123, 134 and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access network can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The IP/MPLS core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on.

For calls that originate or terminate in a different carrier, they can be handled through the PSTN 120 and 121, or the Partner VoIP Carrier 160. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup-signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call, CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the called party accepts the call at location Z, a call acknowledgement signaling message, such as a SIP 200 OK response message if SIP is used, is sent in the reverse direction back to the CCE 111. After the CCE 111 receives the call acknowledgement message, it will then send a call acknowledgement-signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which customers of an email notification service can get notified when calls are either unanswered or end up with busy disposition on a packet network such as a VoIP or SoIP network. The Internet has emerged as a critical communication infrastructure, carrying traffic for a wide range of important scientific, business and consumer applications. Businesses and consumers are moving towards multitasking their communications by being able to receive and send email, hold a telephone conversation, and the like on a common connection. However, if a customer without a caller Identification (ID) and call waiting service is using the phone, the customer may not realize that someone is trying to call him or her. Namely, the caller will continue to receive a busy signal while the called party is unaware that the caller is trying to reach him or her. Similarly, if the customer has call waiting service but does not have caller ID service, the customer may still be unable to determine the identity of the caller and hence the relative importance of the call. For example, a customer may wish to be interrupted only for calls from family members, supervisors, customers and the like. Therefore, the customer may have to interrupt the current conversation unnecessarily for the purpose of determining who is calling. Similarly, if the customer is away from the phone and the customer does not have a voicemail service, then the customer would not be able to determine that someone has called while he or she was away. Therefore, there is a need for a method to notify the called and/or calling parties when the call results in ringing without an answer or a busy disposition.

The present invention discloses a method and apparatus for notifying called and/or calling parties when a call results in ringing without an answer or a busy disposition on a communication network, e.g., a packet network such as a VoIP or SoIP network. The method enables the VoIP or SoIP service provider to register customers for email notification service, gather call detail records or call signaling information in real time, identify the calls with busy or ringing without an answer disposition to and from customers registered for the said service and send an email to the called and/or calling parties containing the information such as time of call, calling party, called party, disposition of call, etc.

In order to clearly illustrate the teachings of the current invention, the following network terminologies will first be described:

Calling party;
Called party;
Call Detail Record (CDR); and
Caller Identification (CID).

Calling party refers to the person or device that originates the call. The called party refers to the person or device that receives the call. For example, if a person calls 911 for obtaining emergency service, the calling party is the person or device used for dialing 911 and the called party is the person, device or service answering the phone and receiving the 911 call.

Call Detail Recording refers to the creation of a database of Call Detail Records (CDRs) in which call data on specific customer or group of telephone or IP addresses for a customer are collected and recorded. Each CDR may include details of the call such as the calling party, the called party, the source and destination addresses of the routers or switches handling the call, the time of the call, the duration of the call, the quality of service, disposition of the call including whether or not the called party was busy, the phone was ringing with no answer and the like. For example, if a customer accesses the VoIP core network through an access network, the customer then uses the VoIP network to transmit and receive packets. The CDR then includes the IP addresses of the calling and called parties, the time and duration of the call, the routers involved, disposition of the call and so on. The CDRs can be used in many processes, e.g., accounting processes that partition the charges, billing processes that create bills requiring payment for services, and so on. In other implementations, the call signaling information can also be determined from application servers and call control elements that have access to the signaling information.

Caller Identification (CID) refers to a network service that sends a calling party's telephone number to the called party such that the called party's telephone equipment could display the calling party's telephone number during the ringing. This allows the called party to identify the calling party prior to answering the call as well as keep a record of all recent calls.

In one embodiment, the method enables the VoIP or SoIP service provider to register customers for email notification service. The customer specifies the email address to be used and the conditions for the notification. For example, a customer may choose to be notified only for received calls and not originated calls, only for originated calls and not received calls, or both options can be selected. A customer may also specify whether a distinction between the various dispositions should be noted and reported in the email notification, e.g., ringing without an answer by the called party who is busy on another call as in call waiting scenario versus ringing without an answer by the called party who is not on another call. Namely, the service provider may obtain the disposition of calls from Call Detail Records (CDRs) or application servers that have access to signaling information in real time, and identifies the calls that resulted in unanswered or busy disposition. For calls that resulted in unanswered or busy disposition, the service provider determines whether or not the called and/or calling party subscribe to the email notification service. If the calling and/or called party subscribe to the email notification service, the service provider will send an email notification to the calling and/or called party containing the caller and called party information, the time and the disposition of the call based on the customer preferences. The notification enables the called party to be made aware that a calling party has been attempting to call the called party, and also enables the calling party to keep records of calls made that were not completed. The calling party may also gain insights as to whether the non-answering called party was actually not available or on another call (if the disposition information is included in the email notification).

Figure 2:
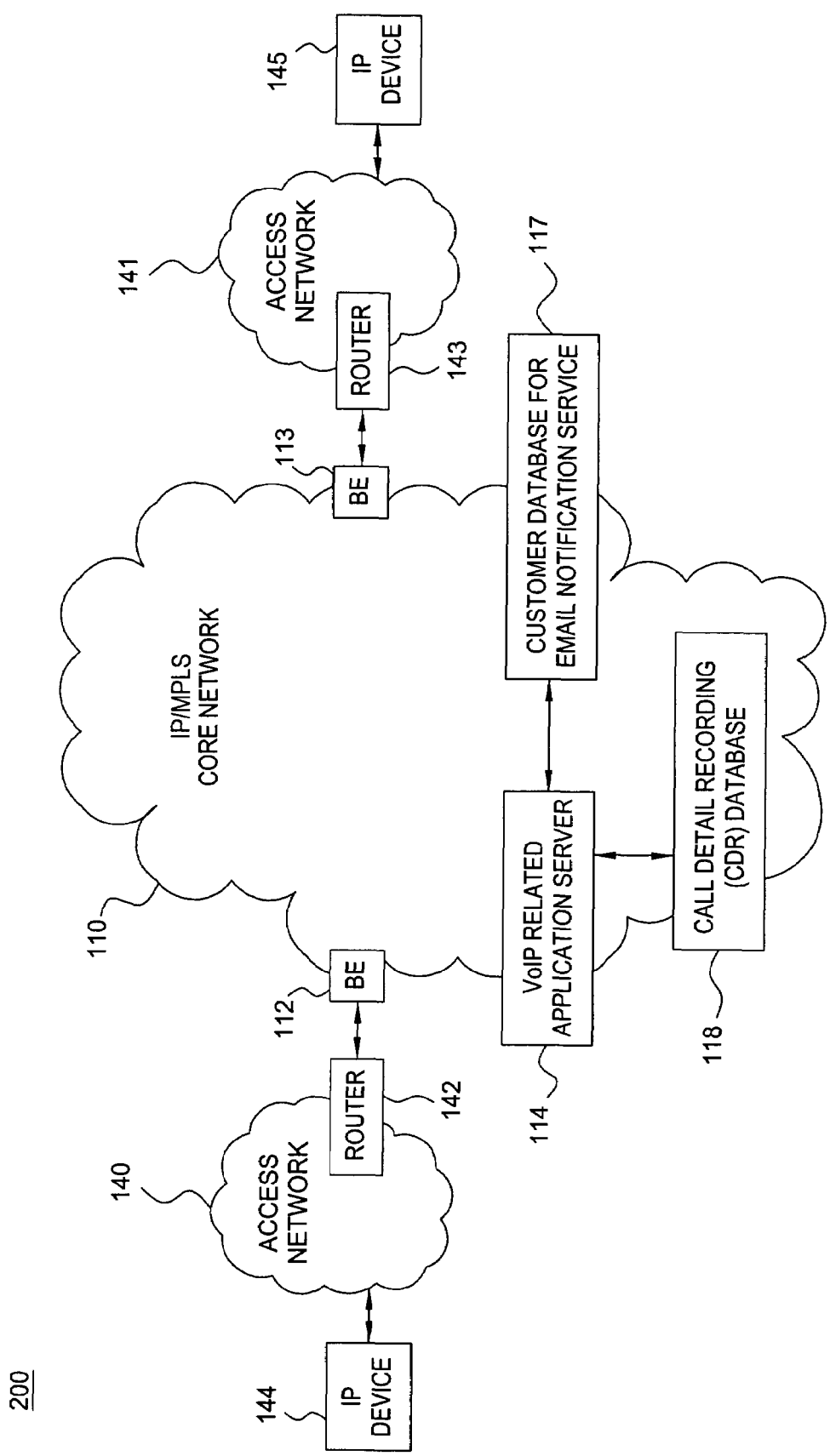
FIG. 2 illustrates an exemplary network for notifying called and/or calling parties.

FIG. 2 illustrates an exemplary communication architecture 200 having a network for notifying called and/or calling parties of a call placement. In this example, the packets are exchanged between customers using IP devices 144 and 145. The IP device 144 is deployed for accessing the VoIP or SoIP services through an access network 140. The packets transmitted by IP device 144 traverse the access network 140 towards the router 142. The router is connected to the IP/MPLS core network 110 through the border element 112. Packets originated by the IP device 144 traverse the core network 110 from border element 112 to border element 113. Border element 113 is connected to an access network 141 through the router 143. The packets from IP device 144 traverse through the access network 141 towards the IP device 145. In one embodiment, a VoIP application server 114 is employed in the IP/MPLS core network 110 that is utilized for sending email notification to called and/or calling parties in accordance with the present invention. The VoIP application server 114 is connected to a customer database for the email notification service 117 and a call detail recording database 118. Customers who subscribe to the email notification service will provide an email address and one or more notification preferences, e.g., what type of information to be included in the email, what type of information not to be included in a notification email (e.g., disposition of the call information) that will be sent to a calling party, and so on. The customer information and preferences are stored in the customer database 117. The call detail records in database 118 is used to collect called and calling party information, IP addresses of routers, disposition of the call, time and duration of the call, etc. Those skilled in the art will realize that the customer database, the call detail recording database and the email notification service can be implemented in the same device or in separate devices. The above embodiment illustrates one exemplary method of implementing the present invention and it is not intended to limit the invention to this particular implementation. Furthermore, FIG. 2 includes only the network elements used to describe the invention. It is not intended to show all network elements used to deliver a VoIP service.

The present method enables the service provider to enable the customers using IP devices 144 and 145 to subscribe to an email notification service. The customers provide the email addresses and conditions for receiving notification. For example, the customer using IP device 144 may prefer to receive notification for received calls (e.g., calls that were missed) and no notification for originated calls (e.g., calls that were made, but not completed, i.e., not answered by the called party). The customer using IP device 145 may prefer to receive notification for all busy or unanswered calls but may desire to distinguish between various dispositions, e.g., ringing without an answer by the called party who is busy on another call versus ringing without an answer by the called party who is not busy, i.e., not available to pick up the call. In one embodiment, the service provider determines the required and optional information for the service and the capabilities for distinguishing among the various call dispositions. For example, one service provider may support distinguishing a ringing without an answer disposition from a busy disposition while another service provider may decide not to provide such details if the called party does not want such information to be made available to called parties. Thus, the present method enables the service provider to obtain the disposition of calls from Call Detail Records, call control elements or applications servers that have access to call signaling information in real time, and identifies the calls that resulted in ringing without an answer or busy disposition. For calls that resulted in unanswered or busy disposition, the service provider then determines whether or not the called and/or calling parties subscribe to the email notification service by utilizing the customer database 117 for the email notification service. In one embodiment, if the calling and/or called parties subscribe to the said service, the service provider will send an email notification to the calling and/or called party containing the caller and called party information, the time and the disposition of the call based on the customer preferences. Note that the called and the calling parties may subscribe to the service independently. The email can be sent only to the called party, to the calling party, to both the calling and called party or neither the called or calling party based on the service subscription. Since the preferences are also determined independently for each customer, the emails sent to the called and calling parties may not be identical.

Figure 3:
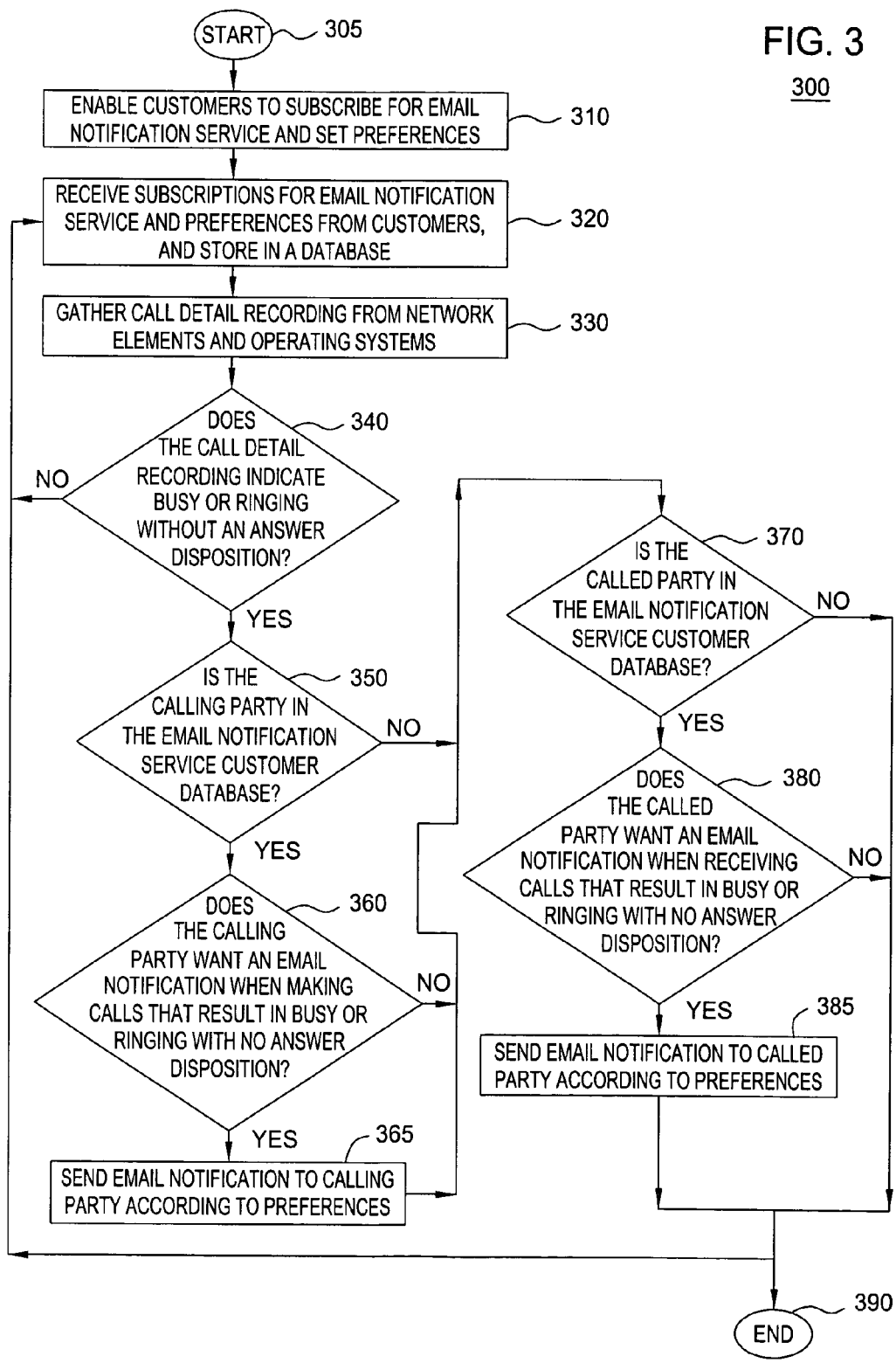
FIG. 3 illustrates a flowchart of the method for notifying called and/or calling parties.

FIG. 3 illustrates the flowchart of the method 300 for notifying called and/or calling parties. The VoIP or SoIP service provider enables customer to subscribe for a notification for call placement service, e.g., an email notification service. The service provider also enables the subscription information and the call detail recording to be gathered by the VoIP or SoIP application server used for the email notification service. In one embodiment, the email notification service for notifying called and/or calling parties is implemented in an application server 114.

Method 300 starts in step 305 and proceeds to step 310. In step 310, method 300 enables customers to subscribe for email notification service and to provide preferences for receiving the notification. For example, the service provider may present to customers a website for entering email address, options such as receive email for originated calls, for received calls, for busy calls, for calls that resulted in ringing without an answer, for all calls, etc. The method then proceeds to receive subscriptions for the service.

In step 320, the method receives subscriptions for the service including email addresses, preferences, etc. Each customer's subscription is independent. Therefore, the calling and called parties receive emails for different conditions and the content of the email for each is determined separately. For example, if the caller subscribes for the service and the called party does not, only the caller receives an email notification. The method then proceeds to step 330 to gather the call detail records.

In step 330, method 300 gathers call detail recording from network elements and/or operating systems that facilitate the calls. The CDR may include call details such as the calling and called parties, the time of the call, duration of the call, the source and destination routers or switches, call disposition such as busy or ringing without an answer, etc. In another embodiment, the information is gathered from either call control elements or application servers that have access to call signaling information.

In step 340, method 300 analyzes the call detail recording to determine whether a call was answered or ended with either a busy disposition (e.g., a busy signal) or a ringing without an answer disposition. If the disposition is either busy or ringing without an answer, the method proceeds to step 350 to determine whether email notification needs to be sent. Otherwise, the method proceeds to steps 320 to continue receiving service subscriptions.

In step 350, method 300 determines whether the calling party is in the customer database used for email notification service. If the calling party subscribes to the notification service, the method proceeds to step 360 to determine whether the conditions for sending email to the calling party are met. Otherwise the method proceeds to step 370 to determine whether an email notification should be sent to the called party.

In step 360, method 300 determines whether the calling party wants an email notification when making calls that result in busy or ringing without an answer disposition. If the customer does not want to receive email notification when making calls, the method proceeds to step 370. Otherwise, the method proceeds to step 365.

In step 365, method 300 sends an email notification according to the preferences provided by the calling party in step 320. For example, the calling party may prefer to receive the notification with the called party information (e.g., name and/or number of called party), time and duration of the call, and/or the disposition of the call. The calling party can use the information for any reason such as logging calling information, setting-up schedule for another attempt to reach the called party, etc.

In step 370, method 300 determines whether the called party is in the customer database used for email notification service. If the called party subscribes to the said service, the method proceeds to step 380 to determine whether the conditions for sending email to the called party are met. Otherwise the method proceeds to step 390.

In step 380, method 300 determines whether the called party wants an email notification when receiving calls that result in busy or ringing without an answer disposition. If the customer does not want to receive email notification when receiving calls, the method proceeds to step 390. Otherwise, the method proceeds to step 385 to send the email to the called party. For example, if the customer has caller ID and call waiting services for received calls, then the customer may prefer to only receive email notifications for outgoing calls.

In step 385, method 300 sends an email notification according to the preferences provided by the called party in step 320. For example, the called party may prefer to receive the notification with the calling party information (e.g., name and/or number of calling party), time and duration of the call, and/or the disposition of the call. The called party can use the information for any reason such as calling back someone who has been trying to reach him or her, interrupting other conversations such that the next attempt would not result in unanswered call, etc. The method then proceeds to step 390 to stop processing the current data for notifying called and calling parties. Alternatively, it may also return to step 320 to continue receiving service subscriptions.

The exemplary flowchart in FIG. 3 provides one illustrative embodiment of the present invention. Those skilled in the art would realize there are other embodiments. For example, the flowchart indicates sending the email notification to the calling party in steps 350, 360 and 365 prior to sending to the called party in steps 370, 380 and 385. Since the email notifications are independent, the specific order as shown in FIG. 3 is flexible and is only exemplary. Furthermore, depending on the processing power of the device used to send the emails, the notifications can be sent in parallel.

Figure 4:
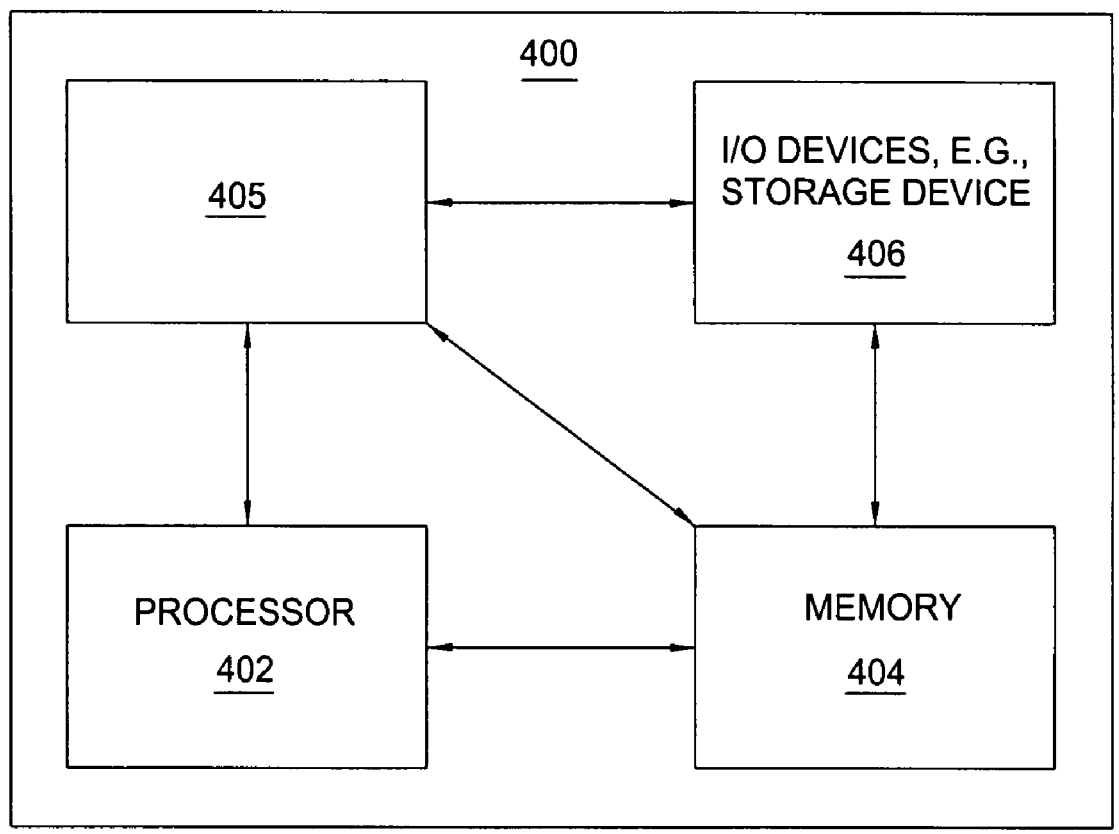
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for notifying called and/or calling parties of a call placement, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module for notifying called and/or calling parties or process 405 can be loaded into memory 404 and executed by processor 402 to implement the functions as discussed above. As such, the present method 405 for notifying called and/or calling parties of a call placement (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a notification email for a call placement in a communication network, comprising:
   determining that a call has resulted in a busy disposition or a ringing without an answer disposition;
   determining whether a calling party associated with said call has subscribed to a notification for call placement service; and
   sending at least one notification email automatically by an application server deployed in said communication network in response to said call resulting in a busy disposition or a ringing without answer disposition to said calling party, if said calling party has subscribed to said notification for call placement service.

2. The method of claim 1, wherein said communication network is a Voice over Internet Protocol (VoIP) network or a Service over Internet Protocol (SoIP) network.

3. The method of claim 1, wherein said call has resulted in a busy disposition or a ringing without an answer disposition is determined from at least one call detail record (CDR) or from an application server having access to signaling information.

4. The method of claim 3, wherein said at least one call detail record (CDR) is gathered from at least one network element or at least one operating system of the communication network that facilitated the call.

5. The method of claim 1, wherein said at least one notification email that is sent to said calling party comprises at least one of: a called party name, a called party number, a time of said call, or a disposition of said call.

6. The method of claim 5, wherein said disposition of said call contains information that further defines said ringing without an answer disposition as said called party being on another call or not available to answer said call.

7. A computer-readable medium having stored thereon a plurality of instructions, the plurality of instructions including instructions which, when executed by a processor, cause the processor to perform the steps of a method for providing a notification email for a call placement in a communication network, comprising:
   determining that a call has resulted in a busy disposition or a ringing without an answer disposition;
   determining whether a calling party associated with said call has subscribed to a notification for call placement service; and
   sending at least one notification email automatically by an application server deployed in said communication network in response to said call resulting in a busy disposition or a ringing without answer disposition to said calling party, if said calling party has subscribed to said notification for call placement service.

8. The computer-readable medium of claim 7, wherein said communication network is a Voice over Internet Protocol (VoIP) network or a Service over Internet Protocol (SoIP) network.

9. The computer-readable medium of claim 7, wherein said call has resulted in a busy disposition or a ringing without an answer disposition is determined from at least one call detail record (CDR) or from an application server having access to signaling information.

10. The computer-readable medium of claim 9, wherein said at least one call detail record (CDR) is gathered from at least one network element or at least one operating system of the communication network that facilitated the call.

11. The computer-readable medium of claim 7, wherein said at least one notification email that is sent to said calling party comprises at least one of: a called party name, a called party number, a time of said call, or a disposition of said call.

12. The computer-readable medium of claim 11, wherein said disposition of said call contains information that further defines said ringing without an answer disposition as said called party being on another call or not available to answer said call.

13. An apparatus for providing a notification email for a call placement in a communication network, comprising:
   means for determining that a call has resulted in a busy disposition or a ringing without an answer disposition;
   means for determining whether a calling party associated with said call has subscribed to a notification for call placement service; and
   an application server in said communication network configured to send at least one notification email to said calling party, if said calling party has subscribed to said notification for call placement service.

14. The apparatus of claim 13, wherein said communication network is a Voice over Internet Protocol (VoIP) network or a Service over Internet Protocol (SoIP) network.

15. The apparatus of claim 13, wherein said call has resulted in a busy disposition or a ringing without an answer disposition is determined from at least one call detail record (CDR) or from an application server having access to signaling information.

16. The apparatus of claim 15, wherein said at least one call detail record (CDR) is gathered from at least one network element or at least one operating system of the communication network that facilitated the call.

17. The apparatus of claim 13, wherein said at least one notification email that is sent to said calling party comprises at least one of: a called party name, a called party number, a time of said call, or a disposition of said call.

18. The apparatus of claim 17, wherein said disposition of said call contains information that further defines said ringing without an answer disposition as said called party being on another call or not available to answer said call.

* * * * *